US009086315B2

(12) United States Patent
Metzger et al.

(10) Patent No.: US 9,086,315 B2
(45) Date of Patent: Jul. 21, 2015

(54) WEIGHING CELL BASED ON THE PRINCIPLE OF ELECTROMAGNETIC FORCE COMPENSATION WITH OPTOELECTRONIC POSITION SENSOR

(71) Applicants: Mettler-Toledo AG, Greifensee (CH); Luce Béguin, Wetzikon (CH)

(72) Inventors: Andreas Metzger, Männedorf (CH); Stephan Baltisberger, Gossau (CH); Hans-Rudolf Burkhard, Wila (CH); Christophe Béguin, Wetzikon (CH); Markus Uster, Nänikon (CH)

(73) Assignee: Mettler-Toledo AG, Greifensee (CH)

( * ) Notice: Subject to any disclaimer, the term of this patent is extended or adjusted under 35 U.S.C. 154(b) by 115 days.

(21) Appl. No.: 13/719,015

(22) Filed: Dec. 18, 2012

(65) Prior Publication Data

US 2013/0161103 A1 Jun. 27, 2013

(30) Foreign Application Priority Data

Dec. 22, 2011 (EP) ..................................... 11195309

(51) Int. Cl.
*G01G 7/04* (2006.01)
*G01G 23/48* (2006.01)

(52) U.S. Cl.
CPC . *G01G 7/04* (2013.01); *G01G 23/48* (2013.01)

(58) Field of Classification Search
CPC ........... G01G 7/02; G01G 7/04; G01G 7/045; G01G 23/48
USPC .................................................. 177/210 EM
See application file for complete search history.

(56) References Cited

U.S. PATENT DOCUMENTS

| 3,727,708 | A |   | 4/1973  | Adler et al.         |         |
|-----------|---|---|---------|----------------------|---------|
| 3,805,907 | A |   | 4/1974  | Knothe et al.        |         |
| 4,274,903 | A | * | 6/1981  | Mock ............................ | 156/355 |
| 4,625,818 | A | * | 12/1986 | Knothe et al. ................. | 177/212 |
| 4,802,541 | A | * | 2/1989  | Bator et al. .................... | 177/212 |
| 4,825,968 | A | * | 5/1989  | Maaz et al. .................... | 177/212 |
| 4,890,246 | A | * | 12/1989 | Oldendorf et al. ............ | 702/101 |
| 4,964,478 | A | * | 10/1990 | Stadler et al. ................. | 177/229 |
| 5,962,818 | A | * | 10/1999 | Komoto et al. ............... | 177/229 |

(Continued)

FOREIGN PATENT DOCUMENTS

| DE | 3743073 A1  | 7/1988 |
|----|-------------|--------|
| DE | 10153603 A1 | 5/2003 |

*Primary Examiner* — Peter Macchiarolo
*Assistant Examiner* — Natalie Huls
(74) *Attorney, Agent, or Firm* — Standley Law Group LLP

(57) ABSTRACT

A weighing cell based on the principle of electromagnetic force compensation. A permanent magnet system is mounted on a base part and includes an air gap within which is suspended a coil that is connected to a load receiver through a force-transmitting mechanism. The coil carries an electrical compensation current when the weighing cell is in operation. An optoelectronic position sensor is also included, and its signal corresponds to the deflection of the coil from a zero position which occurs as a result of placing a load on the load receiver. A closed-loop controller regulates the compensation current in response to the sensor signal in such a way that the coil and the load receiver that is connected to it are returned to their zero position by the electromagnetic force that is acting between the coil and the permanent magnet.

17 Claims, 3 Drawing Sheets

(56) References Cited

U.S. PATENT DOCUMENTS

| | | | |
|---|---|---|---|
| 7,034,278 B2 * | 4/2006 | Tschirren et al. | 250/221 |
| 7,224,871 B2 * | 5/2007 | Willis | 385/52 |
| 7,282,655 B2 * | 10/2007 | Satoh et al. | 177/210 EM |
| 7,307,226 B2 * | 12/2007 | Iiduka | 177/210 EM |
| 7,534,971 B2 * | 5/2009 | Kuhlmann et al. | 177/210 EM |
| 7,690,273 B2 * | 4/2010 | Reber et al. | 73/862.69 |
| 7,964,806 B2 * | 6/2011 | Freydank et al. | 177/25.13 |
| 8,309,867 B2 * | 11/2012 | Baltisberger et al. | 177/212 |
| 2005/0205309 A1 * | 9/2005 | Iiduka et al. | 177/185 |
| 2008/0218303 A1 * | 9/2008 | Baltisberger et al. | 336/223 |
| 2010/0146777 A1 * | 6/2010 | Baik et al. | 29/829 |
| 2010/0165660 A1 * | 7/2010 | Weber et al. | 362/609 |
| 2011/0259634 A1 * | 10/2011 | Alderson et al. | 174/480 |
| 2013/0220711 A1 * | 8/2013 | Beguin et al. | 177/210 EM |

\* cited by examiner

US 9,086,315 B2

WEIGHING CELL BASED ON THE PRINCIPLE OF ELECTROMAGNETIC FORCE COMPENSATION WITH OPTOELECTRONIC POSITION SENSOR

CROSS-REFERENCE TO RELATED APPLICATIONS

This application is entitled to benefit of a right of priority under 35 USC §119 from European patent application 11195309.7, filed 22 Dec. 2011, which is incorporated by reference as if fully recited herein.

TECHNICAL FIELD

The present invention is directed to a balance based on the principle of electromagnetic force compensation.

BACKGROUND

The principle of electromagnetic force compensation has a wide field of application in the many diverse kinds of balances that are used in commerce, in industry, and in laboratories. It is a particular strength of this principle that it allows balances of enormous measuring accuracy to be realized. With an analytical balance that functions according to the principle of electromagnetic force compensation, it is for example possible to measure a weighing load of 100 grams with a measurement resolution of 0.01 milligrams, i.e. with an accuracy of one part in ten million.

The generic type of balance or weighing cell to which the present invention belongs has a stationary base part and a load receiver constrained to the base part so as to allow guided movement of the load receiver relative to the base part, wherein the load receiver serves to receive the weight force of a weighing load. Mounted on the stationary base part is a permanent magnet system with an air gap. A coil in which a compensation current flows is connected to the load receiver by a force-transmitting mechanism and is suspended in the air gap with guided mobility. An optoelectronic position sensor, whose sensor signal is representative of the displacement of the interlinked movable parts of the balance from a zero position which occurs as a result of placing a load on the load receiver, typically includes a light emitter and a light receiver which are mounted on the base part with an interstitial space between them, and further includes a shutter vane which extends through the interstice and participates in the displacement travel of the movable parts. The signal of the position sensor is sent to a closed-loop controller which, in response, regulates the compensation current in such a way that the shutter vane and the movable parts of the balance that are connected to it are returned to their zero position by the electromagnetic force that is acting between the coil and the permanent magnet. In other words, the function of the closed-loop regulation is to maintain equilibrium between the electromagnetic compensation force and the weighing load. According to the laws of electromagnetism, the strength of the coil current and the resultant force are proportional to each other, and the weight of a weighing load placed on the load receiver can therefore be determined by measuring the coil current.

Within the area delineated by the foregoing description, the present invention focuses on the optoelectronic position sensor. The primary requirement that the position sensor of an electromagnetic compensation balance has to meet is that the zero point, i.e. the position of the shutter vane relative to the stationary base part when the sensor signal crosses the zero threshold between negative and positive values, needs to be maintained with the highest degree of accuracy and reproducibility. In addition, the relationship between the sensor signal and the deflection of the shutter vane should as much as possible be linear and reproducible. These requirements need to be met in particular within a given range of ambient temperature and humidity.

In an optoelectronic position sensor according to U.S. Pat. No. 3,805,907, the light source consists of a light-emitting diode, and the light receiver is composed of two phototransistors in a differential arrangement. The phototransistors are arranged diametrically opposite to each other on the face of a carrier disk that is rotatably mounted on the stationary base frame of the balance. By turning the carrier disk the sensitivity, i.e. the magnitude of the sensor signal in relation to the deflection of the shutter vane, can be adjusted. However, this relationship is by no means linear. Strictly speaking, it can therefore not be expressed as a proportionality factor except in the immediate area of the zero point (where it is defined as the slope of the sensitivity curve at the zero point).

In a further optoelectronic position sensor, which is described in U.S. Pat. No. 4,825,968, the light emitter and the light receiver of the position sensor are arranged facing each other across a central cutout in the cover plate of the permanent magnet system. The shutter vane, in this case a light barrier with a slot-shaped aperture which is attached to a balance beam that also carries the compensation coil, reaches upwards into the cutout as a movable light gate between the light emitter and the light receiver. In this arrangement, the reference for the zero position, i.e. the position of the shutter vane where the sensor signal crosses the zero threshold between negative and positive values, is not the supporting base frame of the balance, but the cover plate of the magnet. Due to the different coefficients of thermal expansion in the base frame of the balance and in the permanent magnet arrangement, the zero point reference for the measurements taken by the balance can therefore be subject to a temperature drift.

At a stage in the manufacturing process prior to the actual temperature compensation, the weighing cell is exposed to a series of large temperature swings, i.e. to an aging process, which has the purpose to stabilize the hysteresis loops of the sensitivity and of the zero point and to minimize the extent of further aging. The phenomena of hysteresis and aging can be caused by microscopic displacements in the connecting zones between weighing cell components with unequal thermal expansion.

It is therefore desirable to reduce the number of the components and connecting areas involved, to match the expansion properties of the individual components to each other, and thus to shorten or to entirely save the time required for the aforementioned aging process.

It is therefore the object of the present invention to create a position sensor for a balance that is based on the principle of electromagnetic force compensation, wherein the position sensor surpasses the existing state of the art in meeting the aforementioned primary requirements within a given range of ambient temperature and atmospheric humidity. The first requirement concerns the accuracy and reproducibility of maintaining the zero position which in the present context means the position of the shutter vane relative to the stationary base part when the sensor signal crosses the zero threshold between negative and positive values. In particular, a solution that meets the objective of the invention should reduce the aforementioned temperature hysteresis of the zero point of the measurement scale as much as possible and eliminate the need to perform more aging cycles. Furthermore, the relationship between the sensor signal and the deflection of the shutter vane should as much as possible be linear and reproducible. A further aim is to solve the inventive task in a way which optimally meets the technical conditions imposed by the manufacturing process.

SUMMARY

This task is solved by a balance or weighing cell that is based on the principle of electromagnetic force compensation and has an optoelectronic position sensor according to the invention. An exemplary embodiment of a weighing cell according to the principle of electromagnetic force compensation may include a stationary base part, to which a load receiver is constrained so as to allow guided movement of the load receiver relative to the base part. The load receiver serves to receive the weight force of a weighing load. A permanent magnet system may be mounted on the stationary base part, the magnet system having an air gap. A coil may be suspended in the air gap with guided mobility and adapted to conduct an electrical compensation current when the balance is in operation. The load receiver may be connected to the coil by a force-transmitting mechanism.

An optoelectronic position sensor may be provided, whose sensor signal is representative of the deflection of the coil from a zero position that occurs as a result of placing a load on the load receiver. A closed-loop controller may also be provided and, in response to the sensor signal, may regulate the compensation current in such a way that the coil and the load receiver that is connected thereto are returned to their zero position by the electromagnetic force that is acting between the coil and the permanent magnet.

The optoelectronic position sensor may include a light emitter and a light receiver which are mounted on the base part with an interstitial space between them, and may further include a shutter vane that participates in the movements of the coil and, in the manner of a light gate, cuts through the free space between the light emitter and the light receiver.

According to the invention, the light emitter is mounted on a first carrier element, centered on the connecting line between two first fastening locations of the first carrier element, wherein the first carrier element is arranged on the base part, rigidly attached by way of the two first fastening locations; and/or the light receiver is mounted on a second carrier element, centered on the connecting line between two second fastening locations of the second carrier element, wherein the second carrier element is arranged on the base part, rigidly attached by way of the two second fastening locations.

In a weighing cell according to the invention, wherein a light emitter and/or a light receiver are each mounted directly on a respective carrier element, it is advantageous if the number of connecting locations is small, as this will lead to the final result of reducing the scope of the aforementioned aging process, i.e. shortening the process of the aging cycles, and to a reduction of the zero point hysteresis and an improved sensitivity of the weighing cell.

The light emitter and/or the light receiver can be mounted in a centered position on the connecting line between the two fastening locations, with the connecting line oriented either at a right angle to the direction of the lever deflection or parallel to the direction of the lever deflection.

Preferably, the light emitter and the light receiver are arranged on the base part in such a way that they can be installed from the same side of the base part.

In a preferred embodiment of the invention, the base part and the mechanical connection are made together in one piece out of a monolithic homogeneous material block, wherein flexure pivots are formed in the shape of thin material bridges. For example, in a monolithic design, a lever carrying the shutter vane and the coil is hanging together with the base part in direct material continuity. Since an expansion or contraction resulting from a change in the ambient temperature will be propagated uniformly over the entire monolithically formed material unit, a change of the ambient room temperature will not affect the position of the shutter vane that is attached to the lever in relation to the position of the light beam between the light emitter and light receiver which are attached directly to the base part.

The fastening locations are configured as fastening holes in the respective carrier elements. Preferably, the carrier elements are attached to the base part with grooved drive studs that can be pressed into mounting holes of the base part, passing through the fastening holes of the carrier elements without any loose play. In comparison to screw connections, the attachment with drive studs has the advantage that no screw threads need to be cut in the mounting holes and that the carrier elements are not subjected to stress-generating torques which could occur with the tightening of the screws. This is a point of special concern if the first carrier element and/or the second carrier element is attached directly to the base part.

Preferably, one of the two fastening holes of each carrier element is elongated in the direction of the connecting line of the respective fastening holes in order to allow for a possible discrepancy (within given tolerance limits) between the distance of the fastening holes and the distance of the mounting holes.

The preferred choices for the light emitter and the light receiver are products which, in regard to their installation on the respective carrier element, are designed either according to the so-called surface mount technology or the chip-on-board technology.

In an advantageous embodiment of the invention, all of the first and second mounting holes are open and accessible from the same side of the base part, so that all drive studs can be pressed into the mounting holes in the same direction in a single operating step.

A light-emitting diode may be selected for the light emitter and a differential photodiode for the light receiver. Of course the light emitting diode and the differential photodiode need to be matched to each other in their respective spectral ranges.

The carrier elements are made preferably of a material whose temperature coefficient of linear expansion is matched to the temperature coefficient of linear expansion of the base part at least in the direction of the connecting line of the fastening holes. Material stresses which could occur as a result of different thermal expansions of the carrier element and the base part can thereby be avoided. As a further result of the matched temperature coefficients, the microscopic displacements in the fastening locations are avoided which are caused by unequal thermal expansions and which can lead to the aforementioned hysteresis and aging process of the zero point of the measuring range of the balance.

Furthermore, a carrier element can change its dimensions also through moisture absorption, and this can likewise cause stresses and microscopic dislocations. It is therefore of advantage if the carrier elements are made of a material with a low hygroscopic expansion coefficient.

When the light-emitting diode is in operation, it can develop a considerable amount of heat. To prevent overheating of the light-emitting diode and/or of the first carrier element, the latter should be designed to conduct the heat to the base part as effectively as possible. This requirement is met for example by a carrier element in the form of a circuit board that is configured as a laminate with a heat-conducting layer, such as an aluminum plate, and a dielectric insulation layer on which the conductive traces are arranged through which the light-emitting diode is supplied with electric current. In carrier elements consisting of plastic and ceramic materials which, by themselves, have a poor thermal conductivity, the ability to conduct heat can be improved by applying a layer of copper on the back side and on unused surface portions of the component side.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
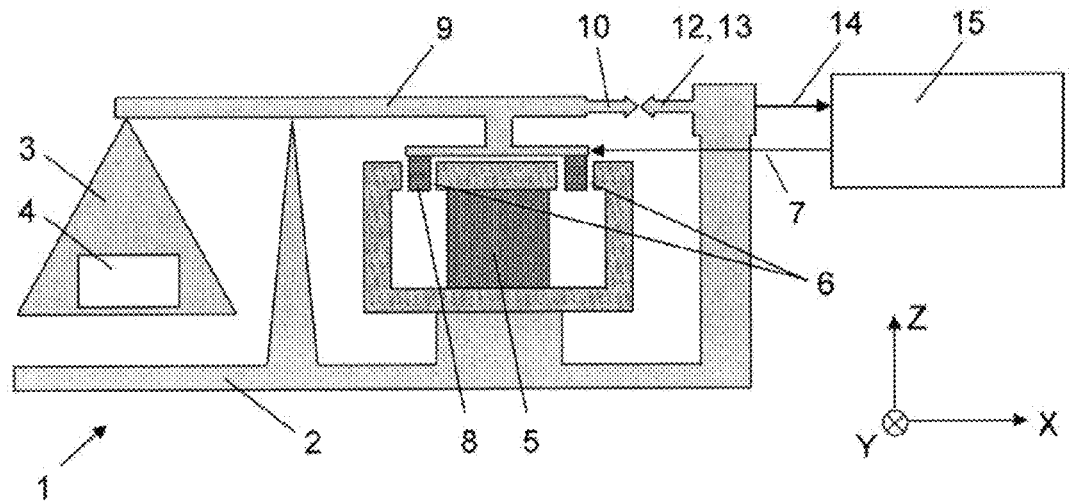
FIG. 1 schematically represents an exemplary balance with electromagnetic force compensation.

An exemplary weighing cell 1 with electromagnetic force compensation and with an optoelectronic position sensor is represented schematically in FIG. 1. A Cartesian coordinate system X, Y, Z is added for reference, with the X-axis and the Z axis lying in the drawing plane of FIG. 1, while the Y-axis is directed into the space behind the drawing plane. Identifiable elements of the weighing cell 1 in this drawing include the stationary base part 2, the load receiver 3 which is constrained by the balance beam 9 with guided mobility relative to the base part 2 and serves to receive the weight force of the weighing load 4, the cup-shaped permanent magnet system 5 (shown in cross-section) which is solidly mounted on the base part 2, the air gap 6 of the magnet system 5 in which the coil 8 conducting the compensation current 7 is movably suspended, as well as the force-transmitting mechanical connection, here in the form of a balance beam 9, between the load receiver 3 and the coil 8. The optoelectronic position sensor (indicated symbolically in FIG. 1 with the view oriented in the Y-direction, and illustrated in detail in FIG. 2 with the view oriented in the X-direction) generates the sensor signal corresponding to the deflection of the coil from its zero position which occurs as a result of placing the load 4 on the load receiver 3. The zero position is symbolically indicated in FIG. 1 by the balanced alignment of the arrows 10 and 12, 13, wherein the arrow 12, 13 which is integrally connected to the base part 2 symbolizes the light emitter 12 and light receiver 13 which are rigidly mounted on the base part 2, facing each other across an interstitial air space (see FIG. 2). The arrow 10, which is integrally connected to the balance beam 9, represents the shutter vane 10 with the slot-shaped aperture 11 (see FIG. 2A) which moves up and down in the interstitial space as indicated by the bidirectional arrow 18, whereby the amount of light flowing from the light emitter 12 to the light receiver 13 is influenced and the sensor signal 14 is generated. The signal 14 of the position sensor is sent to a closed-loop controller 15 which, in response, regulates the compensation current 7 in such a way that the resultant electromagnetic force acting between the coil 8 and the permanent magnet 5 returns the shutter vane 10 together with the balance beam 9, the coil and the load receiver 3 to the zero position where the electromagnetic compensation force is in equilibrium with the weighing load 4. According to the laws of electromagnetism, the compensation force is proportional to the coil current 7. Consequently, the weight of the weighing load 4 placed on the load receiver 3 can be determined by measuring the coil current 7.

Figure 2:
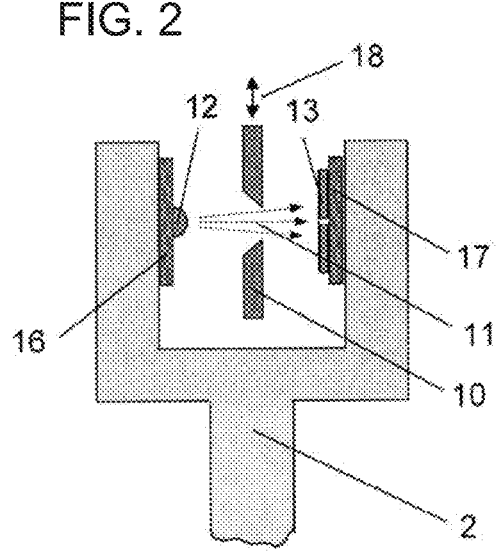
FIG. 2 is a cross-sectional view showing an optoelectronic position sensor with a light emitter, a light receiver and a shutter vane.
Figure 2A:
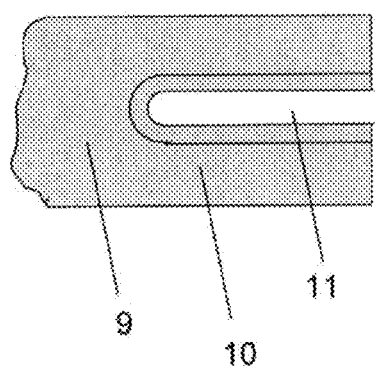
FIG. 2A is a lateral view of the shutter vane of FIG. 2.

In addition, FIG. 2 illustrates the inventive concept that the first carrier element 16 on which the light emitter 12 is mounted and the second carrier element 17 on which the light receiver 13 is mounted are installed directly, i.e. without any intermediate components, on a material portion belonging to the base part 2. This immediate, spatially fixed connection to the base part 2 is particularly advantageous in weighing cells 1 of a monolithic configuration, wherein the base part 2 and the force-transmitting mechanism 9 are formed together of a single homogeneous material block in which the pivots of the levers and coupling members are realized as flexure pivots in the shape of thin material bridges. For example, a lever 9 carrying the shutter vane 10 is hanging together with the base part 2 in a direct material connection through one or more flexure pivots. As the entire monolithically formed material unit expands or contracts uniformly with a change in the ambient temperature, the shutter vane 10 that is attached to the lever 9 and the light emitter 12 and light receiver 13, which on their respective carrier elements 16 and 17 are attached directly to the base part 2, are maintaining their positions in reference to each other with relatively little sensitivity to changes in the room temperature.

Figure 3:
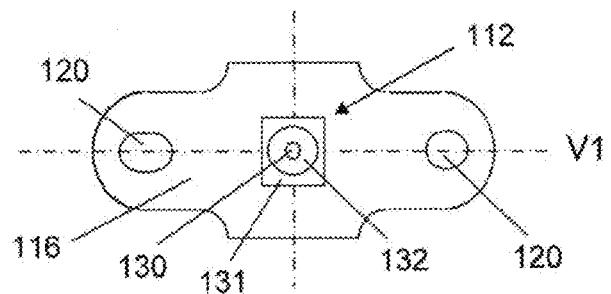
FIG. 3 shows the light emitter in the form of a light-emitting diode, which is installed as a surface mount component on a first carrier element.

In the example of FIG. 3, the first carrier element 116 of the light emitter is configured for example as a first circuit board with first fastening holes 120. As described below in the context of FIG. 5, the base part 202 has mounting holes 220 matched to the fastening holes 120, so that the first carrier element 116 can be attached to the base part 202 with suitable fastener means. As shown in FIG. 3, one of the two first fastening holes 120 of the carrier element 116 is elongated in the direction of the connecting line of the fastening holes 120 in order to allow for a possible discrepancy (within given tolerance limits) between the distance of the fastening holes 120 and the distance of the mounting holes 220.

FIG. 3 shows the first carrier element 116 with the light emitter in the form of a light-emitting diode or LED unit 112. In the form of construction illustrated here, the actual LED element 130 is arranged on a carrier block 131 in a recess 132 that is configured as a reflector. The attachment of the block-shaped LED unit 112 to the first carrier element 116 is designed according to the so-called surface mount technology, which is known to those with a related technical background and which will therefore not be covered in further detail. The block-shaped LED unit 112 should preferably be arranged on the first carrier element 116 at the midpoint between the fastening holes 120 on the connecting line V1, as indicated by the dash-dotted centerlines in FIG. 3.

Figure 4:
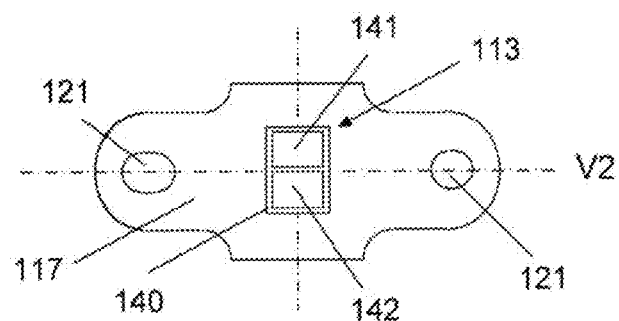
FIG. 4 shows the light receiver in the form of a differential photodiode, which is installed as a chip-on-board component on a second carrier element.
Figure 5:
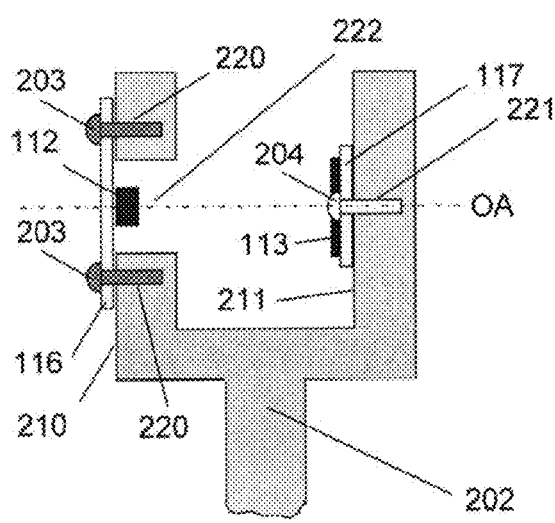
FIG. 5 illustrates, in cross-section, how the carrier elements are fastened in accordance with the invention.

As shown in FIG. 4, the second carrier element 117 of the light receiver is analogous in its configuration to the first carrier element of the light emitter, having for example the form of a second printed circuit board with second fastening holes 121 for the attachment to the corresponding mounting holes 221 of the base part 202 which are shown in FIG. 5. Likewise analogous to the first carrier element 116, one of the two second fastening holes 121 is elongated in the direction of the connecting line V2 of the fastening holes 121 in order to allow for a possible discrepancy (within given tolerance limits) between the distance of the fastening holes 121 and the distance of the mounting holes 221.

The light receiver, which is mounted on the second carrier element 117 consists of a differential photodiode 113 in the form of a thin platelet or chip 140 with two photoactive surface areas 141, 142. The attachment of the platelet-shaped differential photodiode 113 to the second carrier element 117 is designed according to the so-called chip-on-board technology, which is known to those with a related technical background and which will therefore not be covered in further detail. The photodiode unit 140 should preferably be arranged on the second carrier element 117 at the midpoint between the fastening holes 121 and oriented so that the narrow separating strip between the two photoactive surface areas 141, 142 of the differential photodiode 140 is aligned and centered along the connecting line V2 of the fastening holes.

Figure 5A:
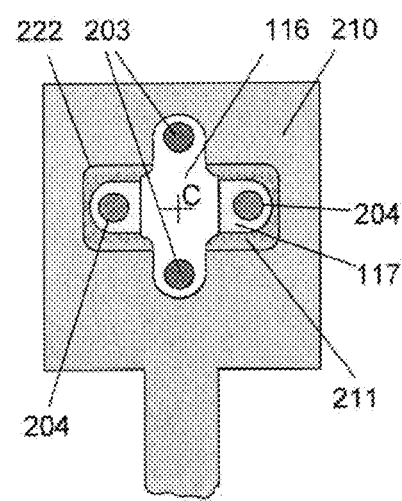
FIG. 5A is a lateral view of FIG. 5.

FIG. 5 shows a central cross-section through the position sensor in a plane that runs parallel to the Y-axis and the Z-axis, while FIG. 5A shows the position sensor in a view that is directed at the fastening surface 210 which runs parallel to the X/Z coordinate plane. The attachment of the carrier elements 116, 117 to the base part 202 is realized preferably with grooved drive studs 203, 204, i.e. nail-like metal pins with lengthwise-grooved shafts which can be pressed into mounting holes 220, 221 of the base part 202 and which pass without loose play through the fastening holes 120, 121. Grooved drive studs are a commercially available product and are, therefore, not further described here. The arrangement of the carrier elements 116, 117 illustrated in FIGS. 5 and 5A is particularly advantageous for the attachment with drive studs 203, 204, as the fastening surfaces 210, 211 are both facing in the same direction (to the left in FIG. 5, and towards the viewer in FIG. 5A). The two carrier elements 116, 117 are turned crosswise to each other about the optical axis which runs in the Y-direction through the midpoints C of the carrier elements 116, 117, with the connecting line of the fastening holes 120 of the first carrier element 116 being oriented in the Z-direction and the connecting line of the fastening holes 121 of the second carrier element 117 being oriented in the X-direction. The grooved drive studs 203 of the first carrier element 116 are thus directly accessible for their forced insertion into the mounting holes 220 of the surface 210. An appropriately shaped passage opening 222 of the base part 202 in the area of the first carrier element 116 allows access for an insertion tool in order to press the grooved drive studs 204 of the second carrier element 117 into the corresponding mounting holes 221 in the surface 211. Thus, the four grooved drive studs 203, 204 for the attachment of the carrier elements 116, 117 can be pressed into the mounting holes from the same side in one operating step.

Figure 6:
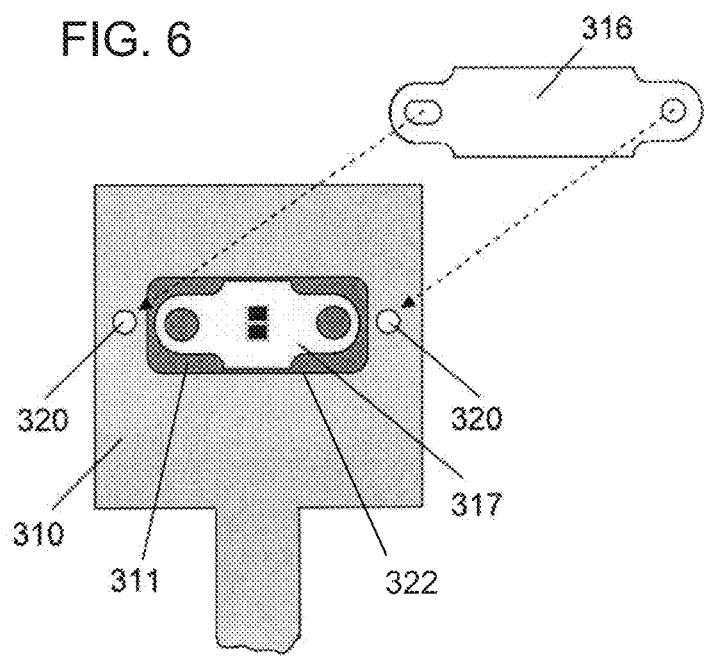
FIG. 6 illustrates an alternative way of fastening the carrier elements in accordance with the invention.

FIG. 6 shows an alternative arrangement where the grooved drive studs can likewise be installed from the same side, but wherein the carrier elements 316, 317 are not oriented crosswise to each other. Under this alternative concept, the first carrier element 316 has a greater length than the second carrier element 317, so that the first carrier element 316 bridges the passage opening 322 in the lengthwise direction and can be fastened to the mounting holes 320 with grooved drive studs as indicated in FIG. 6 by the dotted arrows. However, with this arrangement the second carrier element 317 has to be installed first on the fastening surface 311 which is visible through the passage opening 322, before the first carrier element 316 can be installed in a second operating step on the fastening surface 310 which in FIG. 6 is located closer to the viewer.

Regarding the attachment with grooved drive studs, it should further be noted that this produces a fixed, unyielding connection between the carrier element and the base part. With a change in temperature, it is therefore possible that different amounts of thermal expansion of the carrier element and the base part can give rise to undesirable stresses and to partially irreversible microscopic dislocations and deformations. The carrier elements should therefore be made of a material whose coefficient of linear thermal expansion is matched to the coefficient of linear thermal expansion of the base part at least in the direction of the connecting line of the fastening holes.

As has also been mentioned previously, a carrier element can also change its dimensions as a result of moisture absorption, which can likewise lead to stresses and dislocations. The material of the carrier element should therefore also have, as much as possible, a low coefficient of hygroscopic expansion.

When choosing a material for the carrier elements, it should further be kept in mind that especially the light-emitting diode will generate heat during operation. To prevent excessive heat buildup in the light-emitting diode and the first carrier element, the carrier element material should have good thermal conductivity.

Experiments that were made for this purpose with a base part of aluminum have shown that the aforementioned requirements regarding the temperature coefficient of expansion, the coefficient of hygroscopic expansion and the thermal conductivity can be met for example with a material produced by the Rogers Corporation (www.rogerscorp.com) under the trade name RO 4350™. This material is a laminate of at least one glass fiber-reinforced polymer layer and at least one ceramic layer. This material also has a low thermal conductivity of its own, which can be significantly improved with a copper coating on the backside and possibly also on the unused surface areas of the component side. Good results were also achieved during testing with a carrier element material composed of a metallic layer and a dielectric insulating layer which is manufactured by the Bergquist Company (www.bergquistcompany.com) under the trade name Bergquist T-Clad Thermal Clad®).

Although the invention has been described through the presentation of specific exemplary embodiments, it is evident that based on the teachings of the present invention numerous further variants could be created, for example by combining the features of the individual embodiments described herein and/or by interchanging individual functional units between embodiments and/or by substituting other materials and components for those that are specifically named herein. Therefore, while certain exemplary embodiments of the invention are described in detail above, the scope of the invention is not to be considered limited by such disclosure, and modifications are possible without departing from the spirit of the invention as evidenced by the following claims:

What is claimed is:

1. A weighing cell based on the principle of electromagnetic force compensation, comprising
   a stationary base part;
   a load receiver constrained to the base part in guided movement and serving to receive the weight force of a weighing load;
   a permanent magnet system mounted on the base part, said permanent magnet system having an air gap;

a coil suspended in the air gap with guided mobility and adapted to conduct an electrical compensation current when the weighing cell is in operation;

a deflectable force-transmitting mechanism connecting the load receiver to the coil;

a first carrier element rigidly attached to a first attachment surface of the base part by way of two spaced apart fastening locations that are aligned on a common axis of the first carrier element;

a second carrier element rigidly attached to a second attachment surface of the base part by way of two spaced apart fastening locations that are aligned on a common axis of the second carrier element;

an optoelectronic position sensor comprising a light emitter and a light receiver that are mounted to the base part on opposite sides of a separating interstitial space, and a shutter vane that traverses said interstitial space and participates in the movement of the coil, the light emitter being mounted midway between the two fastening locations of the first carrier element and on the common axis thereof, and the light receiver being mounted midway between the two fastening locations of the second carrier element and on the common axis thereof, a sensor signal of the optoelectronic position sensor being representative of the deflection of the coil from a zero position which occurs as a result of placing a load on the load receiver; and a closed-loop controller which, in response to the sensor signal, regulates the compensation current in such a way that the coil and the load receiver that is connected thereto are returned to their zero position by the electromagnetic force that is acting between the coil and the permanent magnet;

wherein the first attachment surface of the base part and the second attachment surface of the base part face the same direction such that the first carrier element and the second carrier element are installable from the same side of the base part.

2. A weighing cell according to claim 1, wherein the common axis shared by the fastening locations of the first carrier element and the common axis shared by the fastening locations of the second carrier element is oriented at a right angle to the direction of the force-transmitting mechanism deflection.

3. A weighing cell according to claim 1, wherein the common axis shared by the fastening locations of the first carrier element and the common axis shared by the fastening locations of the second carrier element is oriented parallel to the direction of the force-transmitting mechanism deflection.

4. A weighing cell according to claim 1, wherein the common axis shared by the fastening locations of the first carrier element and the common axis shared by the fastening locations of the second carrier element are oriented at a right angle to one another.

5. A weighing cell according to claim 1, wherein:
the fastening locations of the first and the second carrier elements are configured, respectively, as first fastening holes in the first carrier element and as second fastening holes in the second carrier element;
wherein the first carrier element and the second carrier element are respectively attached directly to the first and second attachment surfaces of the base part; and
wherein the first and second attachment surfaces of the base part each include first and second mounting holes corresponding, respectively, to the fastening locations of the first and second carrier elements.

6. A weighing cell according to claim 5, wherein at least one of the first carrier element and the second carrier element are attached to the base part with grooved drive studs that can be pressed into the mounting holes and which pass through the respective fastening holes in the associated carrier element(s) without any loose play.

7. A weighing cell according to claim 6, wherein the first mounting holes in the first attachment surface of the base part are open and accessible from the same side of the base part as the second mounting holes in the second attachment surface of the base part, so that all drive studs can be pressed into the respective mounting holes from said same side.

8. A weighing cell according to claim 7, wherein the light emitter and the light receiver are respectively arranged on the first and second carrier elements in such a way that they are installable from the same side of the base part.

9. A weighing cell according to claim 5, wherein one of the fastening holes in the first carrier element and one of the second holes in the second carrier element are elongated in the direction of the common axis shared by the respective fastening holes.

10. A weighing cell according to claim 1, wherein the installation of the light emitter on the first carrier element and/or the installation of the light receiver on the second carrier element is realized through surface mount technology.

11. A weighing cell according to claim 1, wherein the installation of the light emitter on the first carrier element and/or the installation of the light receiver on the second carrier element is realized through chip-on-board technology.

12. A weighing cell according to claim 1, wherein the light emitter comprises a light-emitting diode and/or the light receiver comprises a differential photodiode.

13. A weighing cell according to claim 1, wherein the base part and the force-transmitting mechanism are made in one piece out of a monolithic homogeneous material block, and wherein a flexure pivot therebetween is formed in the shape of a thin material bridge.

14. A weighing cell according to claim 1, wherein the first carrier element and the second carrier element are made of a material whose temperature coefficient of linear expansion is matched to the temperature coefficient of linear expansion of the base part at least in the direction of the shared common axis of the respective fastening locations.

15. A weighing cell according to claim 1, wherein the first carrier element and/or the second carrier element are made of a material with a small coefficient of hygroscopic expansion.

16. A weighing cell according to claim 1, wherein the first carrier element is designed to drain away the heat that is generated by the light emitter and conduct it to the base part.

17. A weighing cell according to claim 1, wherein the light emitter is located on a back side of the first carrier element and the light receiver is located on a front surface of the second carrier element, such that the light emitter and light receiver will face each other after the carrier elements are attached to the base part from the same side thereof.

* * * * *